(12) United States Patent
Brown

(10) Patent No.: US 9,921,356 B2
(45) Date of Patent: Mar. 20, 2018

(54) DISPLAY BACKLIGHT WITH LIGHT MIXING STRUCTURES

(71) Applicant: Apple Inc., Cupertino, CA (US)

(72) Inventor: Michael J. Brown, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 15/091,444

(22) Filed: Apr. 5, 2016

(65) Prior Publication Data

US 2017/0082788 A1    Mar. 23, 2017

Related U.S. Application Data

(60) Provisional application No. 62/222,603, filed on Sep. 23, 2015.

(51) Int. Cl.
*G02F 1/1335* (2006.01)
*F21V 8/00* (2006.01)

(52) U.S. Cl.
CPC ............. *G02B 6/002* (2013.01); *G02B 6/005* (2013.01); *G02B 6/0018* (2013.01); *G02B 6/0021* (2013.01); *G02B 6/0028* (2013.01); *G02B 6/0036* (2013.01); *G02B 6/0038* (2013.01); *G02B 6/0043* (2013.01); *G02B 6/0068* (2013.01); *G02B 6/0055* (2013.01); *G02F 1/133615* (2013.01)

(58) Field of Classification Search
CPC .................................................. G02F 1/133615
See application file for complete search history.

(56) References Cited

U.S. PATENT DOCUMENTS

| | | | |
|---|---|---|---|
| 7,936,420 B2 | 5/2011 | Kim et al. | |
| 8,079,743 B2 | 12/2011 | Bailey et al. | |
| 9,101,001 B2 | 8/2015 | Wagner | |
| 9,207,383 B2 | 12/2015 | Kim et al. | |
| 2006/0238367 A1* | 10/2006 | Tsuchiya | G02B 6/0016 340/815.4 |
| 2009/0167987 A1* | 7/2009 | Kim | G02B 6/0038 349/65 |
| 2014/0049726 A1 | 2/2014 | Qi et al. | |
| 2014/0119051 A1 | 5/2014 | Qiao et al. | |
| 2016/0116667 A1* | 4/2016 | Shiraishi | G02B 6/0068 349/65 |

* cited by examiner

*Primary Examiner* — Nathanael R Briggs
*Assistant Examiner* — Alexander Gross
(74) *Attorney, Agent, or Firm* — Treyz Law Group, P.C.; Joseph F. Guihan

(57) ABSTRACT

A display may have a backlight unit with a row of light-emitting diodes that emit light into the edge of a light guide layer. The light guide layer may have opposing upper and lower surfaces. The upper surface of the light guide layer may have ridges and the lower surface of the light guide layer may have bumps. The edge of the light guide layer may have light mixing structures. The light mixing structures may include an alternating pattern of protrusions with different shapes. For example, triangular protrusions of a first size may be patterned with triangular protrusions of a second size. The light mixing structures may reduce the mixing distance of the backlight unit.

16 Claims, 15 Drawing Sheets

DISPLAY BACKLIGHT WITH LIGHT MIXING STRUCTURES

This application claims the benefit of provisional patent application No. 62/222,603 filed on Sep. 23, 2015, which is hereby incorporated by reference herein in its entirety.

BACKGROUND

This relates generally to electronic devices with displays, and, more particularly, to displays with backlights.

Electronic devices such as computers and cellular telephones have displays. Some displays such as plasma displays and organic light-emitting diode displays have arrays of pixels that generate light. In displays of this type, backlighting is not necessary because the pixels themselves produce light. Other displays contain passive pixels that can alter the amount of light that is transmitted through the display to display information for a user. Passive pixels do not produce light themselves, so it is often desirable to provide backlight for a display with passive pixels.

In a typical backlight assembly for a display, a light guide layer is used to distribute backlight generated by a light source such as a light-emitting diode light source. Optical films such as a diffuser layer and prism films may be placed on top of the light guide layer. A reflector may be formed under the light guide layer to improve backlight efficiency.

A strip of light-emitting diodes may provide light to an edge of a light guide layer. Light from the strip of light-emitting diodes is initially concentrated in the vicinity of the outputs of the light-emitting diodes. The light must travel a sufficient distance into the light guide layer to mix enough to be used as backlight illumination. Backlight units that require large mixing distances may consume more volume within a display than desired.

It would therefore be desirable to be able to provide displays with improved backlights.

SUMMARY

A display may have an array of pixels for displaying images for a viewer. The array of pixels may be formed from display layers such as a color filter layer, a liquid crystal layer, a thin-film transistor layer, and polarizer layers.

A backlight unit may be used to produce backlight illumination for the display. The backlight illumination may pass through the polarizers, the thin-film transistor layer, the liquid crystal layer, and the color filter layer. The backlight unit may have a row of light-emitting diodes that emit light into a light guide layer.

The light guide layer may have first and second opposing surfaces connected by an edge that receives light from the row of light-emitting diodes. The edge of the light guide layer may have a pattern of light mixing structures configured to distribute light. The pattern may include a first plurality of light mixing structures with a first shape that alternates with a second plurality of light mixing structures with a second shape that is different than the first shape. Each light mixing structure of the first plurality of light mixing structures may be interposed between respective first and second light mixing structures of the second plurality of light mixing structures.

The light mixing structures may include triangular protrusions with varying sizes. The different shaped protrusions may mix the backlight quickly without producing a cross-hatched pattern of light.

Further features will be more apparent from the accompanying drawings and the following detailed description.

DETAILED DESCRIPTION

Figure 1:
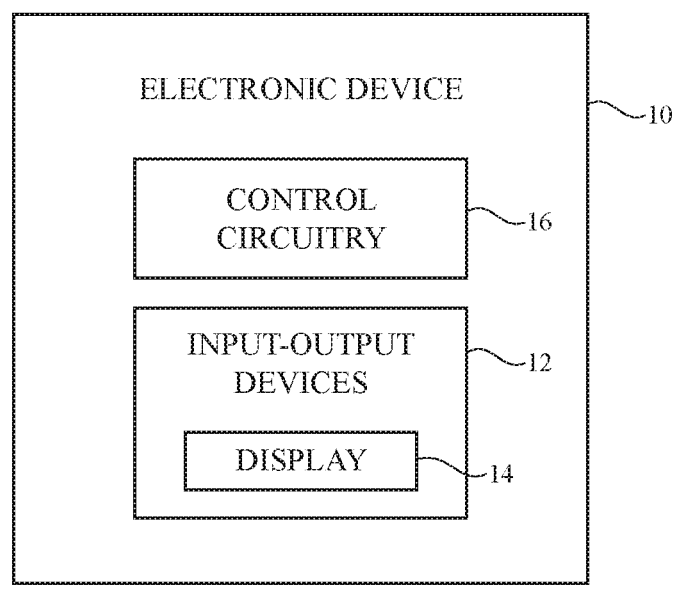
FIG. 1 is a schematic diagram of an illustrative electronic device having a display in accordance with an embodiment.

An illustrative electronic device of the type that may be provided with a display is shown in FIG. 1. As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Control circuitry 16 may be used to run software on device 10 such as operating system code and applications. During operation of device 10, the software running on control circuitry 16 may display images on display 14.

Device 10 may be a tablet computer, laptop computer, a desktop computer, a television, a cellular telephone, a media player, a wristwatch device or other wearable electronic equipment, or other suitable electronic device.

Display 14 for device 10 includes an array of pixels. The array of pixels may be formed from liquid crystal display (LCD) components or other suitable display structures. Configurations based on liquid crystal display structures are sometimes described herein as an example.

A display cover layer may cover the surface of display 14 or a display layer such as a color filter layer, thin-film transistor layer, or other portion of a display may be used as the outermost (or nearly outermost) layer in display 14. The outermost display layer may be formed from a transparent glass sheet, a clear plastic layer, or other transparent member.

Figure 2:
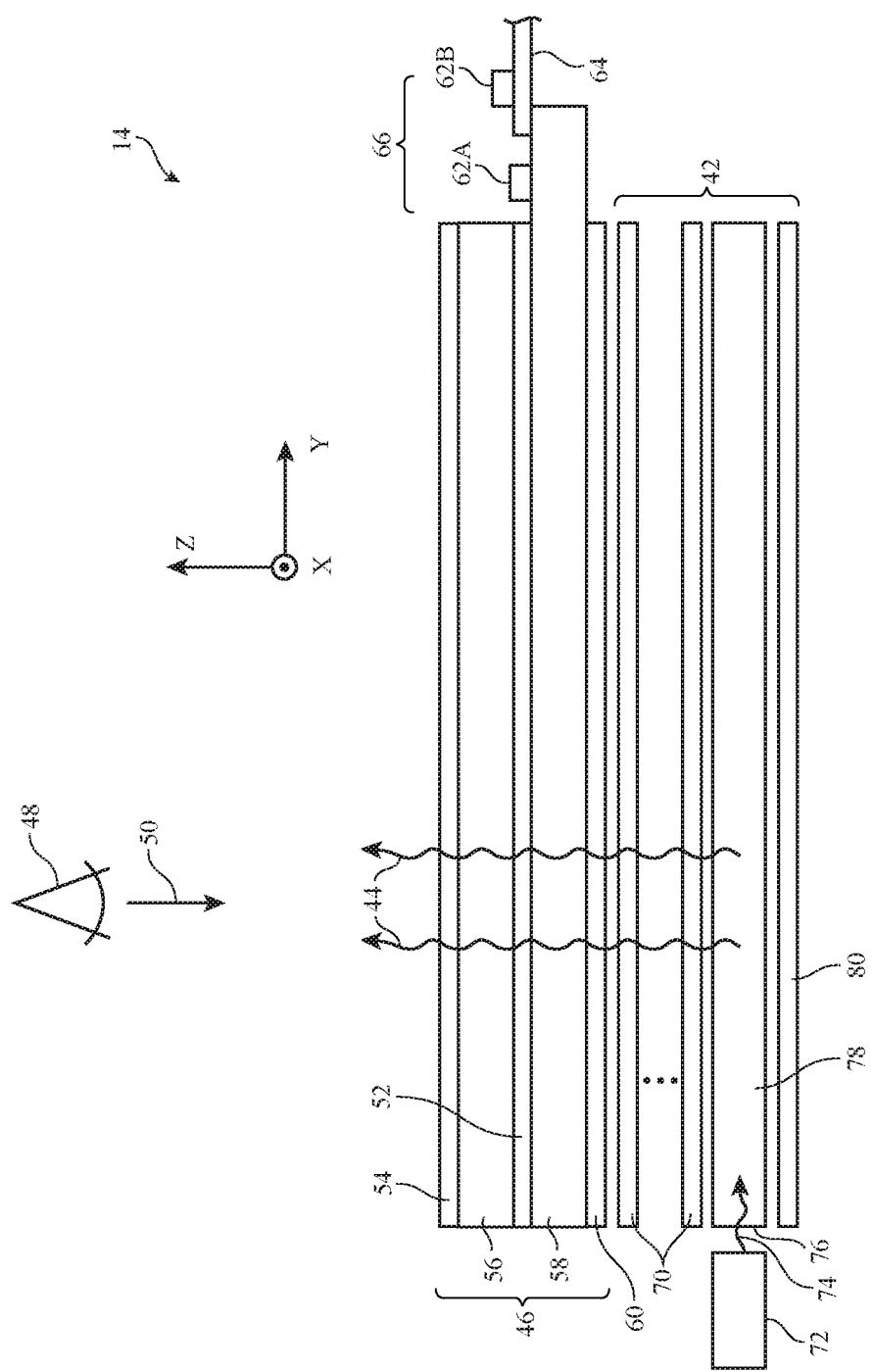
FIG. 2 is a cross-sectional side view of an illustrative display in an electronic device in accordance with an embodiment.

A cross-sectional side view of an illustrative configuration for display 14 of device 10 is shown in FIG. 2. As shown in FIG. 2, display 14 may include a backlight unit such as backlight unit 42 (sometimes referred to as a backlight or backlight structures) for producing backlight 44. During operation, backlight 44 travels outwards (vertically upwards in dimension Z in the orientation of FIG. 2) and passes through pixel structures in display layers 46. This illuminates any images that are being produced by the pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in a housing in device 10 or display layers 46 may be mounted directly in an electronic device housing for device 10 (e.g., by stacking display layers 46 into a recessed portion in a metal or plastic housing). Display layers 46 may form a liquid crystal display or may be used in forming displays of other types.

In a configuration in which display layers 46 are used in forming a liquid crystal display, display layers 46 may include a liquid crystal layer such a liquid crystal layer 52.

Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer may also be used.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example). Integrated circuits such as integrated circuit 62A and/or flexible printed circuits such as flexible printed circuit 64 may be attached to substrate 58 in ledge region 66 (as an example).

Backlight structures 42 may include a light guide layer such as light guide layer 78. Light guide layer 78 may be formed from a transparent material such as clear glass or plastic. Light guide layer 78 may sometimes be referred to as a light guide plate or a light guide film. During operation of backlight structures 42, a light source such as light source 72 may generate light 74. Light source 72 may be, for example, an array of light-emitting diodes (e.g., a series of light-emitting diodes that are arranged in a row that extends into the page in the orientation of FIG. 2). The array of light-emitting diodes may be mounted to a rigid or flexible printed circuit. The printed circuit may be adhered to adjacent layers in the electronic device. In certain embodiments, the printed circuit may be adhered to portions of light guide layer 78.

Light 74 from light source 72 may be coupled into edge surface 76 of light guide layer 78 and may be distributed in dimensions X and Y throughout light guide layer 78 due to the principal of total internal reflection. Light guide layer 78 may include light-scattering features such as pits, bumps, grooves, or ridges that help light exit light guide layer 78 for use as backlight 44. These features may be located on an upper surface and/or on an opposing lower surface of light guide layer 78. With one illustrative configuration, which is described herein as an example, a first surface such as the lower surface of light guide layer 78 has a pattern of bumps and an opposing second surface such as the upper surface of light guide layer 78 has a pattern of ridges (sometimes referred to as lenticules, lenticular structures, or lenticular ridges). Light source 72 may be located at the left of light guide layer 78 as shown in FIG. 2 or may be located along the right edge of layer 78 and/or other edges of layer 78.

Light 74 that scatters upwards in direction Z from light guide layer 78 may serve as backlight 44 for display 14. Light 74 that scatters downwards may be reflected back in the upward direction by reflector 80. Reflector 80 may be formed from a reflective structure such as a substrate layer of plastic coated with a dielectric mirror formed from alternating high-index-of-refraction and low-index-of-refraction inorganic or organic layers. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots. Optical films 70 may also include prism films (sometimes referred to as turning films) for collimating backlight 44. Optical films 70 may overlap the other structures in backlight unit 42 such as light guide layer 78 and reflector 80. For example, if light guide layer 78 has a rectangular footprint in the X-Y plane of FIG. 2, optical films 70 and reflector 80 may each have a matching rectangular footprint. Optical films 70 may include compensation films for enhancing off-axis viewing or compensation films may be formed within the polarizer layers of display 14 or elsewhere in display 14.

Figure 3:
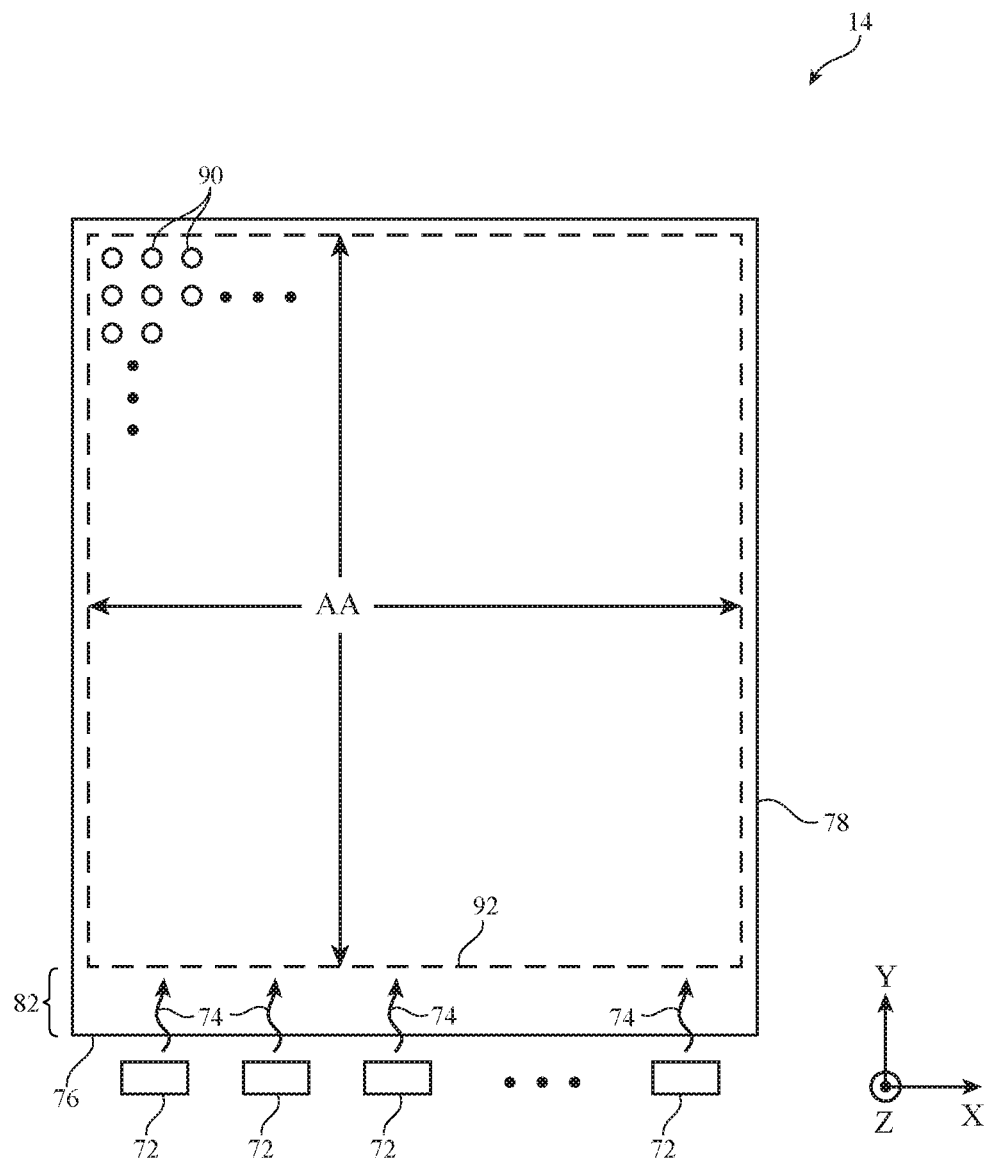
FIG. 3 is a top view of an illustrative display in accordance with an embodiment.

FIG. 3 is a top view of a portion of display 14 showing how display 14 may have an array of pixels 90 formed within display layers 46. Pixels 90 may have color filter elements of different colors such as red color filter elements R, green color filter elements G, and blue color filter elements B. Pixels 90 may be arranged in rows and columns and may form active area AA of display 14. The borders of active area AA may be slightly inboard of the borders of light-guide layer 78 to ensure that there are no visible hotspots in display 14 (i.e., no areas in which the backlight illumination for display 14 is noticeably brighter than surrounding areas). For example, border 92 of active area AA may be offset by a distance 82 from lower edge 76 of light guide layer. It is generally desirable to minimize the size of distance 82 so that display 14 is as compact as possible for a given active area size. Nevertheless, distance 82 should not be too small to ensure that there is adequate light mixing. In particular, distance 82 should be sufficiently large to allow light 74 that is emitted from light-emitting diodes 72 to homogenize enough to serve as backlight illumination. Distance 82 is often as long as necessary to ensure light from light-emitting diodes 72 is sufficiently mixed. Accordingly, distance 82 may sometimes be referred to as mixing distance 82. When light 74 is initially emitted from individual light-emitting diodes 72, light 74 is concentrated at the exits of light-emitting diodes 72 and is absent in the spaces between light-emitting diodes 72. After light 74 has propagated sufficiently far within light-guide layer 78 (i.e., after light 74 has traversed a sufficiently large mixing distance 82), light 74 will be smoothly distributed along dimension X and will no longer be concentrated near the exits of respective individual light-emitting diodes 72.

Figure 4:
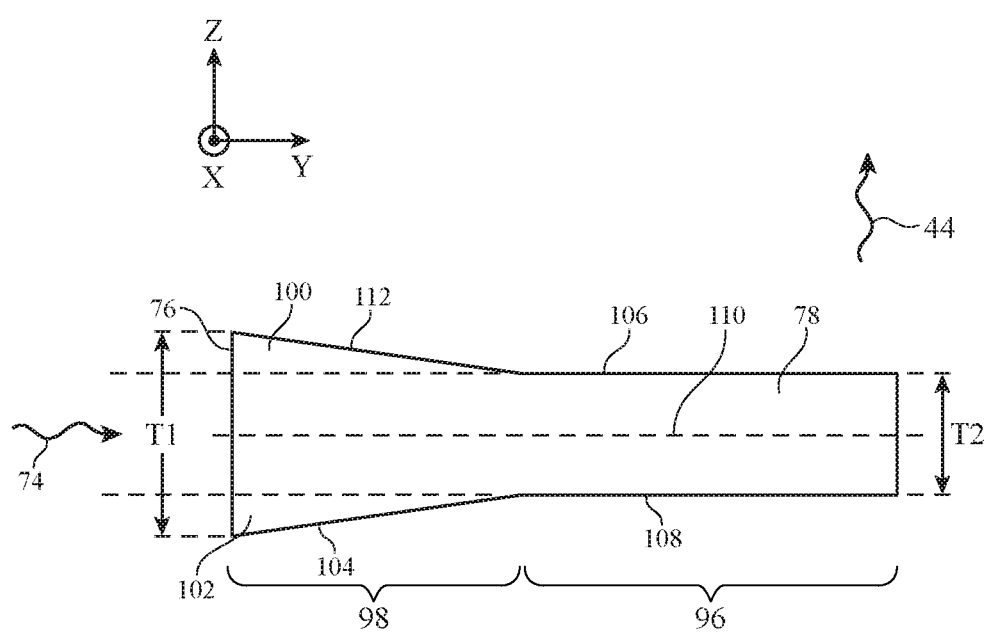
FIG. 4 is cross-sectional side view of an illustrative symmetrically tapered portion of a light guide layer for a display backlight in accordance with an embodiment.

To enhance the efficiency with which light 74 is coupled into edge 76 of light guide layer from light-emitting diodes 72 without overly thickening light-guide layer 78, it may be desirable to provide light-guide layer 78 with an outwardly tapered (flared) edge. Conventional edge tapers are formed by creating a taper in the upper surface of a light guide layer adjacent to the light-emitting diodes and leaving the opposing planar lower surface of the light guide layer untouched. If care is not taken, however, this type of taper may have an angle that is too steep, raising the potential for excessive light leakage due to the loss of total internal reflection conditions in the taper region. With the illustrative taper configuration shown in the cross-sectional side view of illustrative light guide layer 78 of FIG. 4, excessive light losses are avoided by providing light guide layer 78 with both upper and lower taper structures 100 and 102, respectively. Tapers 102 and 100 may be symmetrical or tapers 102 and 100 may have different shapes. In region 96, light-guide layer 78 is planar and has planar parallel opposing upper and lower surfaces 106 and 108, respectively. In taper region 98, light guide layer 78 has a thickness that varies from the thickness of region 96 (T2) to enlarged thickness T1 at edge 76, so taper structure surfaces 112 and 104 are angled at non-zero angles with respect to planar upper and lower light guide layer surfaces 106 and 108. Thickness T2 may be about 400 microns 300-500 microns, less than 600 microns, more than 200 microns, or other suitable thickness. The enlarged size of dimension T1 helps light guide layer 78 receive light 74 from light-emitting diodes 72. The taper in light guide layer 78 formed by taper structures 100 and 102 helps concentrate light 74 into region 96 of light guide layer for use in forming backlight 44.

Figure 5:
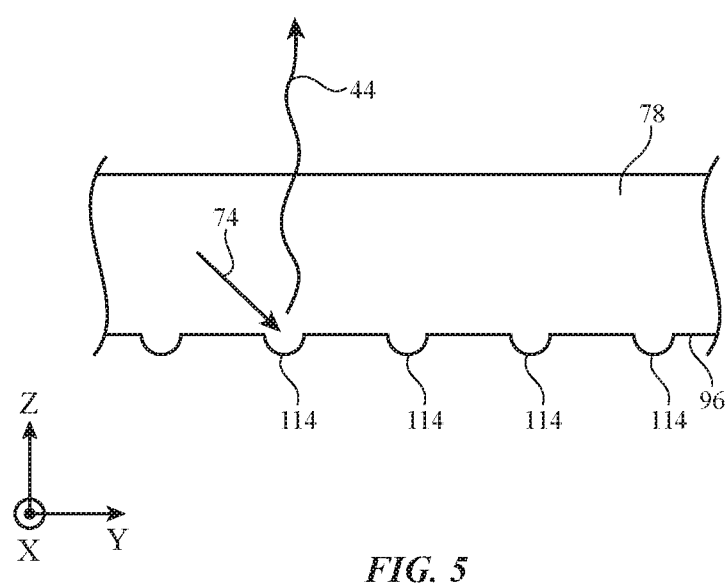
FIG. 5 is a cross-sectional side view of an illustrative light guide layer with light-scattering features such as bumps on its lower surface in accordance with an embodiment.

As shown in FIG. 5, lower surface 96 of light guide layer 78 may be provided with light scattering features such as bumps (protrusions) 114. Bumps 114 may help redirect light 74 that is traveling within the interior of light guide layer 78 upwards in direction Z to serve as backlight 44 for display 14.

Figure 6:
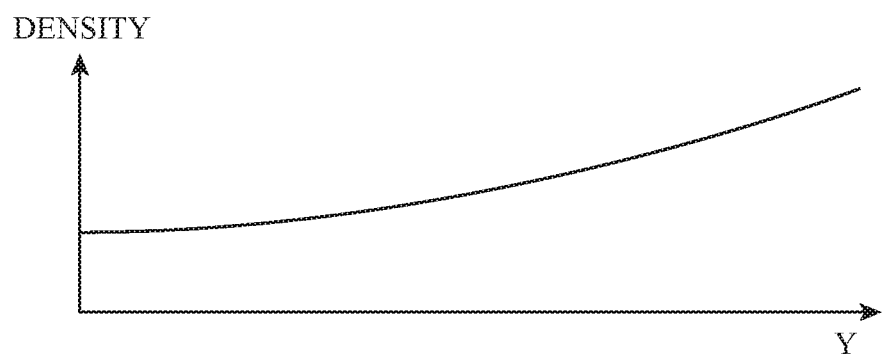
FIG. 6 is graph in which bump density has been plotted as a function of position along the length of a light guide layer in accordance with an embodiment.

As light 74 that is traveling within light guide layer 78 is directed upwards in direction Z to serve as backlight 44, the intensity of the light 74 that remains in light guide layer 78 decreases. As a result, the intensity of light 74 is greatest at edge 76 of light guide layer 78 adjacent to light-emitting diodes 72 and decreases with increasing distance along axis Y away from edge 76. It is generally desirable for the intensity of backlight 44 to be evenly distributed across the surface of light guide layer 78 in dimensions X and Y. To ensure that backlight 44 is not too dim at large values of Y, the density of bumps 114 can be increased as a function of increasing value of Y, as shown in FIG. 6. The increase in the density of bumps 114 at larger Y values offsets the decrease in the intensity of light 74 within light guide layer at larger Y values and thereby ensures that backlight 44 has a uniform intensity as a function of dimension Y.

Figure 7:
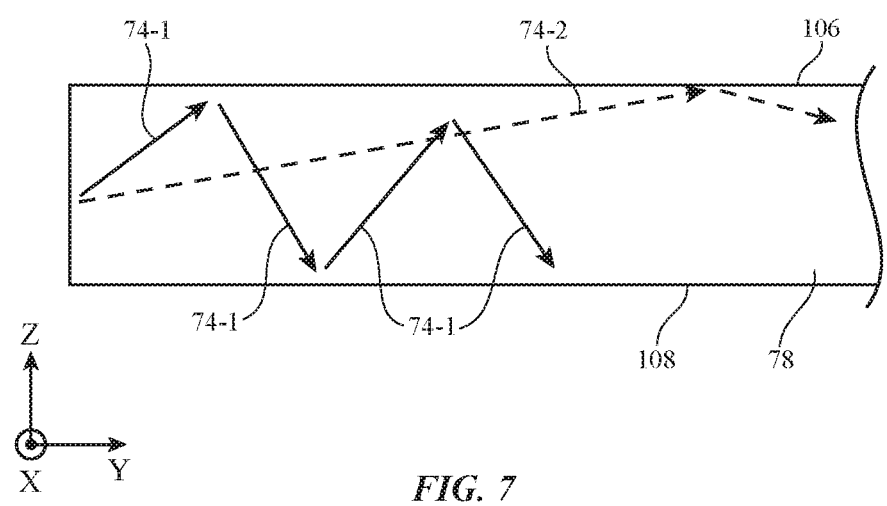
FIG. 7 is a cross-sectional side view of a light guide layer showing how different light rays interact with the surfaces of the light guide layer by different amounts in accordance with an embodiment.
Figure 8:
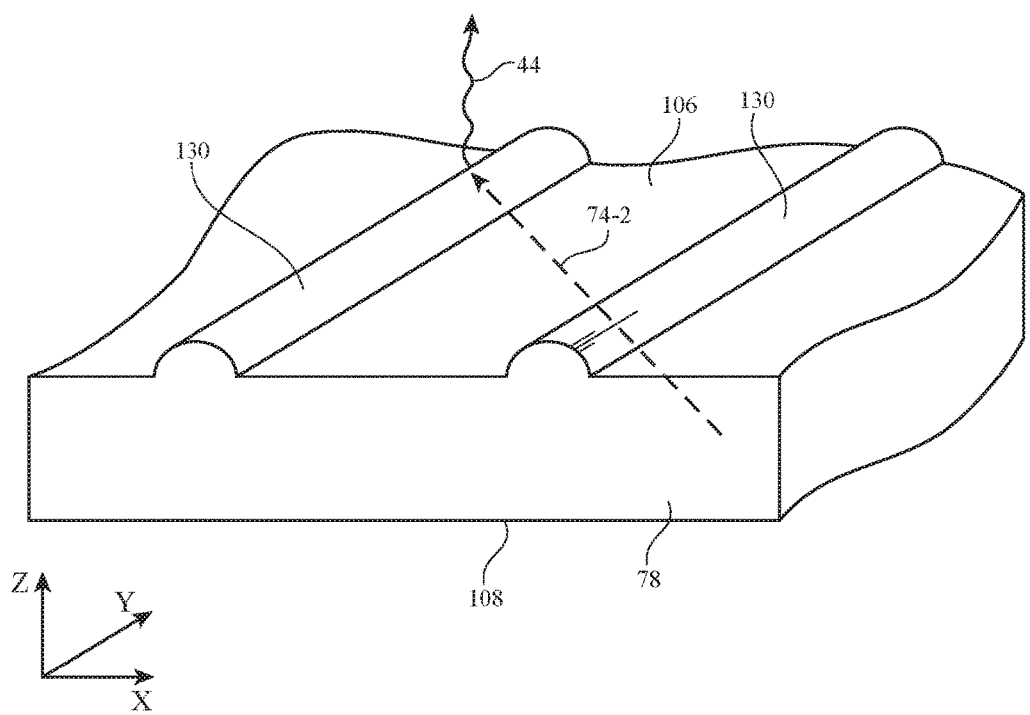
FIG. 8 is a cross-sectional perspective view of a light guide layer showing how rounded ridges may extend along the upper surface of the light guide layer in accordance with an embodiment.

Light-emitting diodes 72 emit light 74 in a cone. This cone of light includes highly angled off-axis light rays. As shown in the cross-sectional side view of light guide layer 78 of FIG. 7, some of the highly angled light rays such as light ray 74-1 lie primarily in the YZ plane. These light rays interact strongly with upper surface 106 and lower surface 108 of light guide layer and therefore tend to be heavily extracted by bumps 114 on lower surface 108. Other highly angled light rays in the cone of emitted light 74 such as illustrative light ray 74-2 in FIG. 7 lie primarily in the XY plane. These rays are angled more along dimension X than dimension Z and therefore interact with surfaces 106 and 108 less frequently than ray 74-1. To ensure that light rays such as light ray 74-2 are adequately extracted and can serve as backlight 44, light guide layer 78 may be provided with lenticular ridges such as ridges 130 of FIG. 8. Ridges 130 may be formed on upper surface 106 of light guide layer 78 (as an example). As shown in FIG. 8, ridges 130 may run parallel to dimension Y (i.e., the direction in which the exit faces of light-emitting diodes 72 are oriented and the direction in which light 74 is emitted into edge 76 of light guide layer 78). Ridges 130 may have semicircular cross-sectional shapes or may have other suitable shapes (triangular, etc.). As shown in FIG. 8, the presence of ridges 130 may help extract highly angled light rays such as light ray 74-2 that are propagating close to the XY plane to produce corresponding backlight 44.

Figure 9:
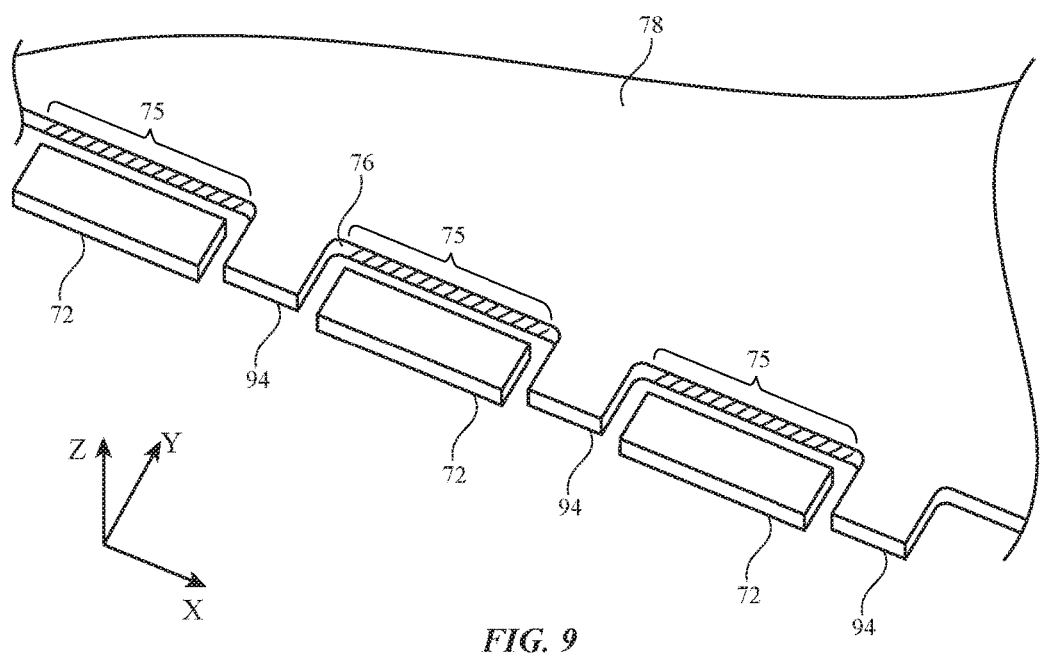
FIG. 9 is a perspective view of an illustrative light guide layer with light mixing structures along an edge in accordance with an embodiment.

FIG. 9 is a perspective view of an illustrative light guide layer. As shown, the light guide layer may have protruding portions 94 that extend between light-emitting diodes 72. The light-emitting diodes 72 may be positioned on a rigid or flexible printed circuit (not shown in FIG. 9). Protruding portions 94 may act as a substrate for securing the printed circuit. For example, adhesive may attach the bottom surface of protruding portions 94 to a rigid or flexible printed circuit. Light-emitting diodes may be positioned on the printed circuit such that each light-emitting diode is interposed between two protruding portions 94 when the printed circuit is adhered to protruding portions 94. Any type of adhesive may be used to attach protruding portions 94 to a rigid or flexible printed circuit (e.g., pressure sensitive adhesive, liquid cured adhesive, light cured adhesive, etc.).

As discussed in connection with FIG. 3, a given mixing distance may be necessary to ensure that light from light-emitting diodes is homogenous before entering the active area of the display. In order to reduce the size of display 14 and, accordingly, electronic device 10, it may be desirable to reduce the length of mixing distance 82. To reduce mixing distance 82, edge 76 of light guide layer 78 may include light mixing structures. Edge 76 may be defined as the surface that connects the top surface of light guide layer 78 to the bottom surface of light guide layer 78. Edge surface 76 may be substantially perpendicular to the top and bottom surfaces of light guide layer 78. Edge surface 76 may be substantially perpendicular to optical films 70 and reflector 80. Regions 75 of edge surface 76 (e.g., the regions in front of the light-emitting diodes) may include light mixing structures. Light mixing structures may be included on the edge of light guide layer 78 for the portions of edge 76 that are directly in front of light-emitting diodes 72. This will ensure that light exiting light-emitting diodes 72 travels through the light mixing structures while entering light guide layer 78.

Figure 10:
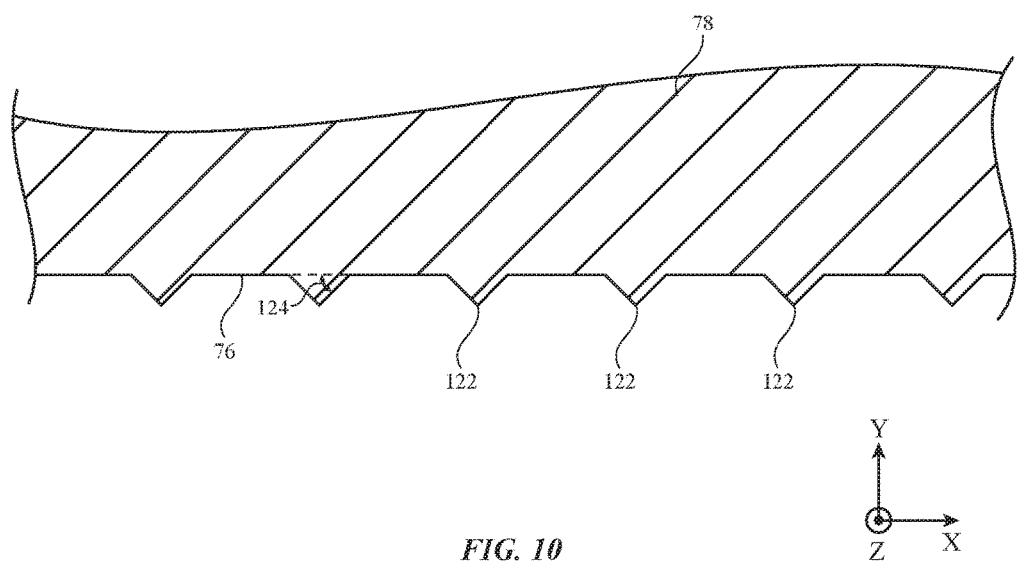
FIG. 10 is a top view of an illustrative light guide layer showing protrusions for mixing light in accordance with an embodiment.

FIG. 10 is a top view of an illustrative light guide layer with light mixing structures. As shown in FIG. 10, edge 76 of light guide layer 78 may be provided with locally raised features such as protrusions 122. Protrusions 122 may have semicircular profiles, or may have other shapes. For example, each protrusion 122 may have a triangular shape. Angle 124 may be about 5-45° or another suitable value to help refract light 74 at angles in layer 78, thereby enhancing light mixing and helping to reduce mixing distance 82 (FIG. 3). Protrusions 122 may have widths (in dimension X) of about 25-75 microns or other suitable widths. Protrusions 122 may be spaced apart by about 200 microns (i.e., 200 microns may separate the tip of one protrusion from the tip of an adjacent protrusion), 150-250 microns, less than 320 microns, or more than 150 microns (as examples). Protrusions 122 may be spread evenly along edge 76 or may be clustered adjacent to respective light-emitting diodes 72.

Protrusions 122 may all be a uniform size and shape. For example, each protrusion 122 may have a triangular shape with identical dimensions (as shown in FIG. 10). In these embodiments, light that travels through protrusions may travel in the pattern shown in FIG. 11. As shown, light may be emitted from a light emitting diode such as light emitting diode 72A. The light that passes through protrusions 122 may be split into two cones of light. A first cone 74A may be diverted in the negative X-direction while a second cone 74B may be diverted in the positive X-direction. Both cones 74A and 74B may also travel in the positive Y-direction.

Figure 11:
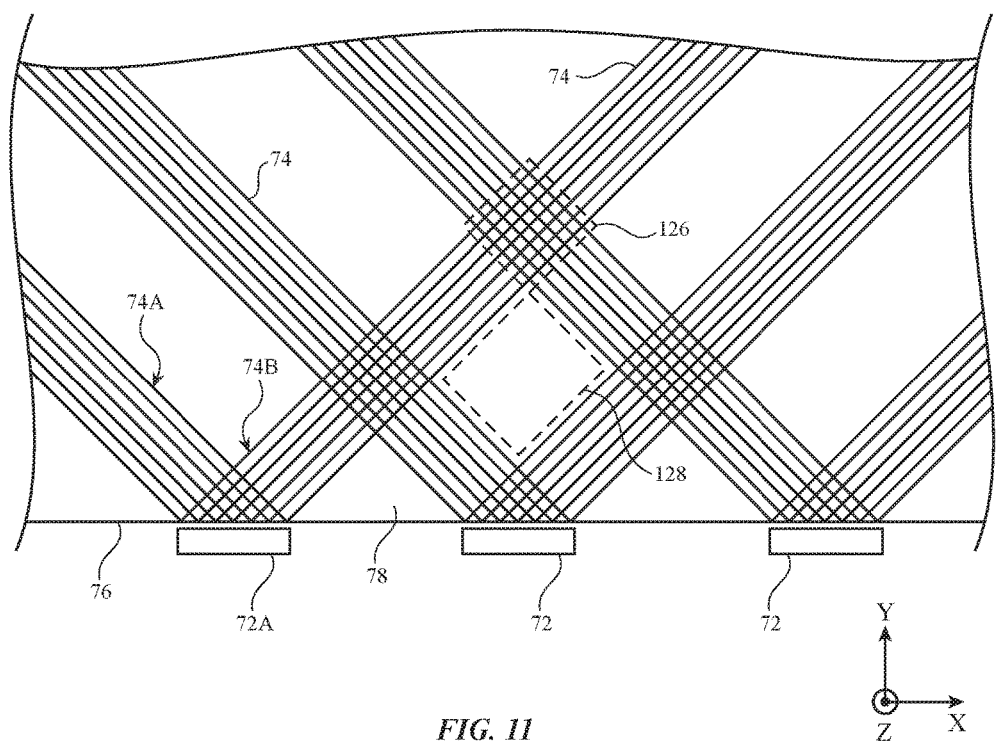
FIG. 11 is a top view of an illustrative light guide layer showing a cross-hatched pattern of light that results from protrusions of the type shown in FIG. 10 in accordance with an embodiment.

Because the light mixing structures on edge 76 of light guide layer 78 are all identical (as shown in FIG. 10), the light from each light emitting diode 72 may be split into similar cones of light. The result is a cross-hatched pattern of light as shown in FIG. 11. There may be a pattern of regions such as region 126 where light from the cones of light overlap, producing a brighter area of light. Other regions such as region 128 may not be overlapped by any of the cones and therefore be a dimmer area of light. This regular pattern of bright regions in the backlight may be visible to the user of the electronic device.

In FIG. 11, the cones of light are illustrated as evenly spaced columns of light. This is merely illustrative and it should be understood that the actual cones of light would have much more spreading and exhibit a much less regular pattern. However, a simplified version of the light pattern is shown so as to not obfuscate the cross-hatched pattern formed from uniform light mixing structures such as those shown in FIG. 10.

Figure 12:
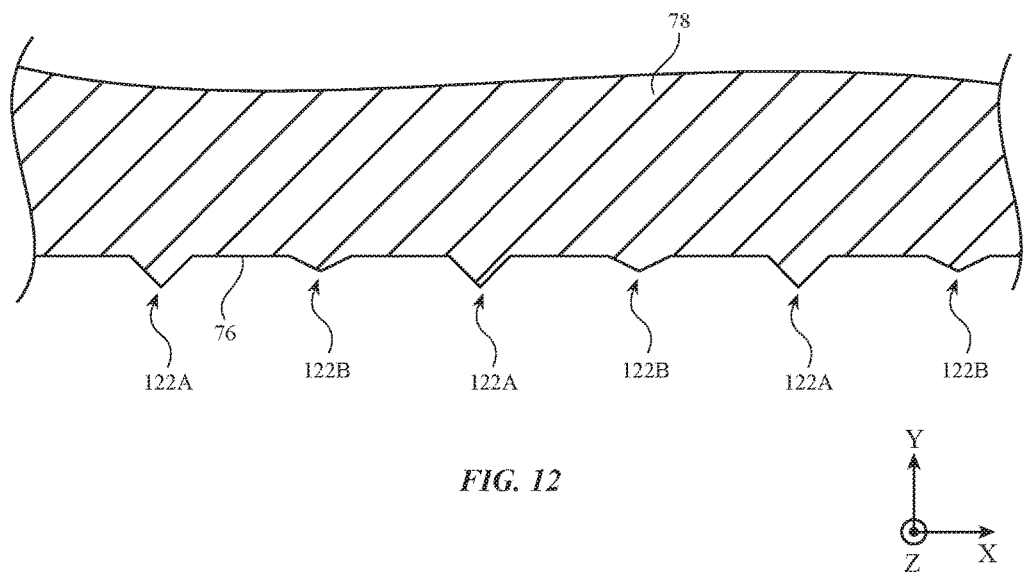
FIG. 12 is a top view of an illustrative light guide layer with an alternating pattern of protrusions in accordance with an embodiment.

To avoid the cross-hatched pattern of light shown in FIG. 11, edge 76 of light guide layer 78 may include light mixing structures with different shapes, as shown in FIG. 12. As shown, light guide layer 78 may include a first set of protrusions 122A and a second set of protrusions 122B. Each set of protrusions may have a different shape. The protrusions may be arranged in an alternating pattern such that each protrusion 122A is only adjacent to protrusions 122B and protrusions 122B are only adjacent to protrusions 122A. Including light mixing structures such as protrusions 122A and 122B may reduce mixing distance 82 without resulting in the cross-hatched pattern shown in FIG. 11.

The example of two sets of protrusions with different shapes is merely illustrative. If desired, there may be three sets of protrusions with different shapes, four sets of protrusions with different shapes, or more than four sets of protrusions with different shapes. The sets of protrusions may be arranged in any desired pattern. A pattern may be used where a single protrusion from each set is arranged sequentially and then this unit is repeated in an alternating pattern. However, more than one protrusion from each set may be arranged sequentially (e.g., two protrusions from the first set, two protrusions from the second set, two protrusions from the third set) and the pattern repeated. In general, any pattern of protrusions that uses protrusions with at least two different shapes may be used.

It should also be understood that the light mixing structures are not limited exclusively to protrusions. For example, recesses may be used that provide the same spreading characteristics as protrusions. In certain embodiments, prisms that spread light may be included to spread the light. Additionally, the shape of the light mixing features is not limited to triangles. Protrusions 122 may have a triangular shape, a semicircular shape, a semi-oval shape, or any other desired shape.

Figure 13:
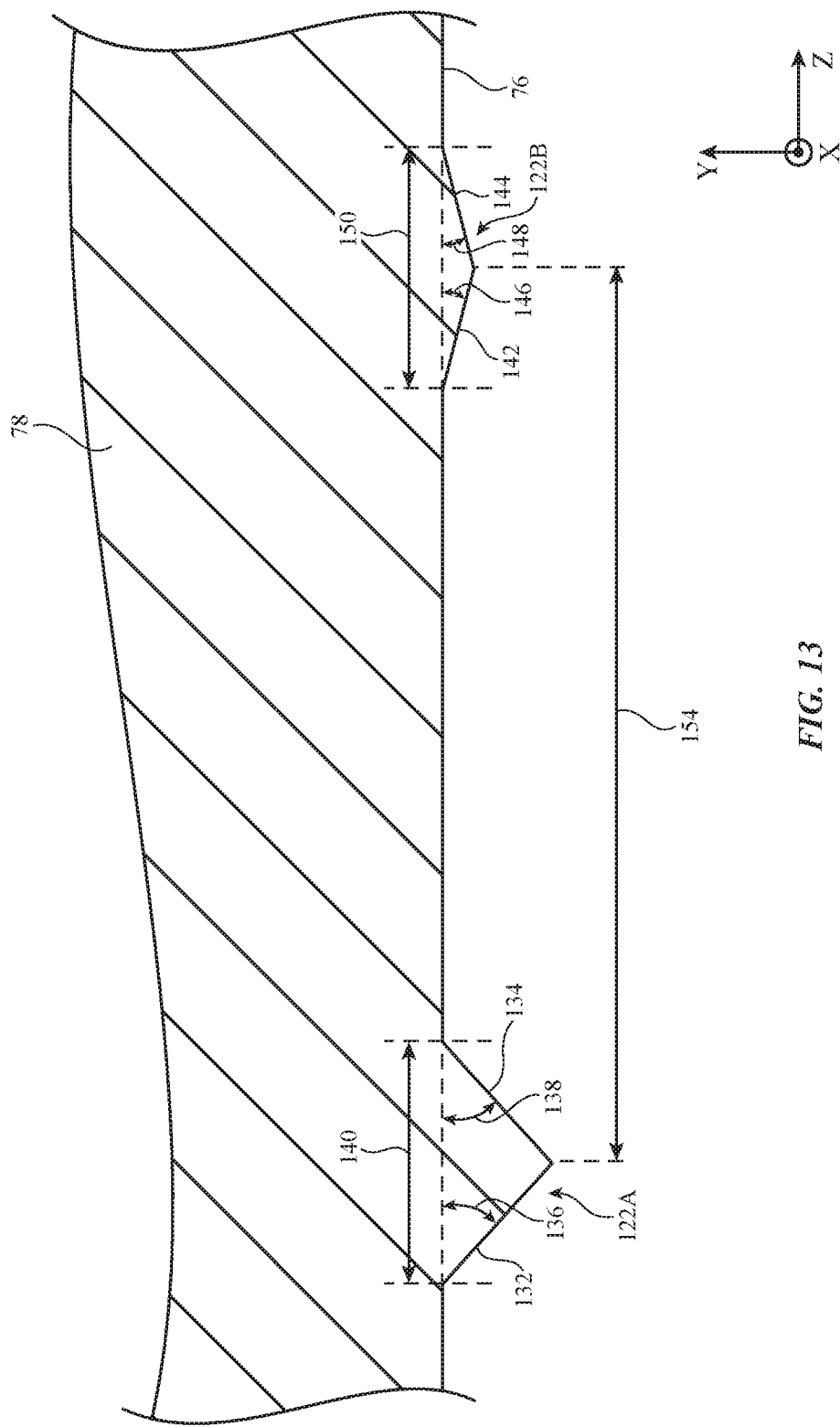
FIG. 13 is a top view of illustrative protrusions with non-uniform shape in accordance with an embodiment.

FIG. 13 is a close-up view of light mixing structures with different shapes on edge 76 of light guide layer 78. As shown, protrusion 122A may be a triangle with a first shape, while protrusion 122B may be a triangle with a second shape that is different than the first shape. Protrusions 122A and 122B may both be symmetrical triangles (e.g., isosceles triangles), or other types of triangles. The edge of light guide layer 78 may have a planar portion from which protrusions 122A and 122B extend. Protrusion 122A may have a first surface 132 that is at an angle 136 with respect to the planar portion of the edge. Protrusion 122A may have a second surface 134 that is at an angle 138 with respect to the planar portion of the edge. Angles 136 and 138 may be the same or may be different. Similarly, surface 132 and surface 134 may have the same lengths or different lengths. In one illustrative embodiment, angles 136 and 138 are the same and both between 25° and 40° or both between 20° and 30°. Angles 136 and 138 may both be 25°, may both be 30°, or may both be 35°. Angles 136 and 138 may be less than 30° or less than 60°. The base of protrusion 122A may have a length 140 of between 25 microns and 75 microns, about 50 microns, less than 25 microns, more than 25 microns, or any other desired length.

Protrusion 122B may have a first surface 142 that is at an angle 146 with respect to the planar portion of the edge. Protrusion 122B may have a second surface 144 that is at an angle 148 with respect to the planar portion of the edge. Angles 146 and 148 may be the same or may be different. Similarly, surface 142 and surface 144 may have the same lengths or different lengths. In one illustrative embodiment, angles 146 and 148 are the same and both between 17.5° and 22.5°, both between 10° and 22.5°, both between 5° and 25°, or both between 10° and 15°. Angles 146 and 148 may both be 20° or may both be 12.5°. Angles 146 and 148 may be less than 30° or less than 60°. The base of protrusion 122B may have a length 150 of between 25 microns and 75 microns, about 50 microns, less than 25 microns, more than 25 microns, or any other desired length.

Length 150 of each protrusion 122B may be the same as the length 140 of each protrusion 122A. Alternatively, length 150 of each protrusion 122B may be different than the length 140 of each protrusion 122A. The distance between the tips of each protrusion (distance 154) may be any desired distance (e.g., between 100 and 300 microns, less than 100 microns, more than 100 microns, about 200 microns, etc.). Distance 154 may be the same throughout the pattern of protrusions (i.e., the distance between each protrusion is the same). Alternatively, some protrusions may be spaced closer together and some protrusions may be spaced further apart.

Figure 14:
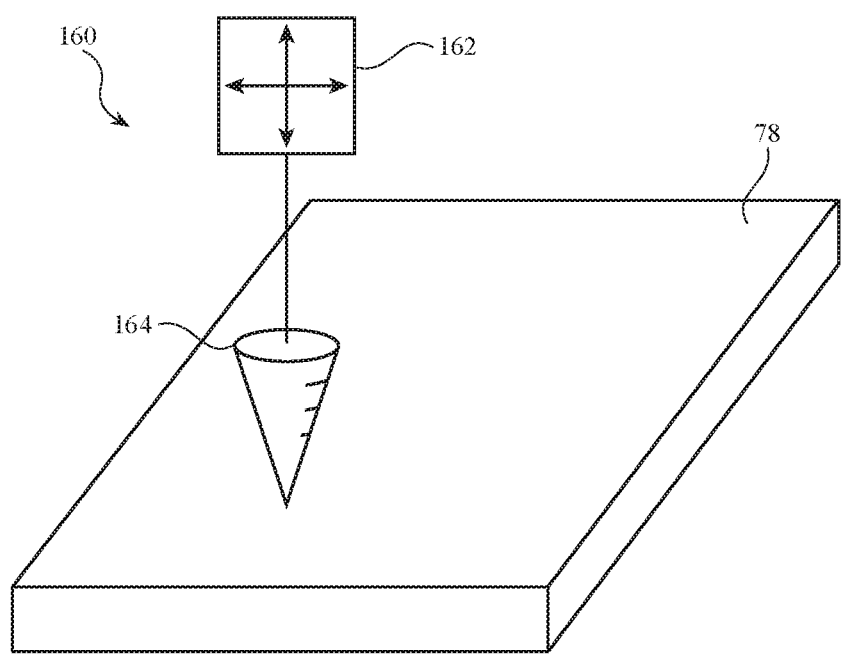
FIG. 14 is a perspective view of a light guide layer processing tool in accordance with an embodiment.

FIG. 14 shows light guide layer processing tool 160 for forming protrusions such as protrusions 122A and 122B in FIGS. 12 and 13. Light guide layer processing tool 160 may include a robotically or manually controlled positioner 162 that is attached to bit 164. Light guide layer processing tool 160 may use bit 164 to cut light guide layer 78 and form protrusions. Bit 164 may be, for example, a diamond bit.

Figure 15:
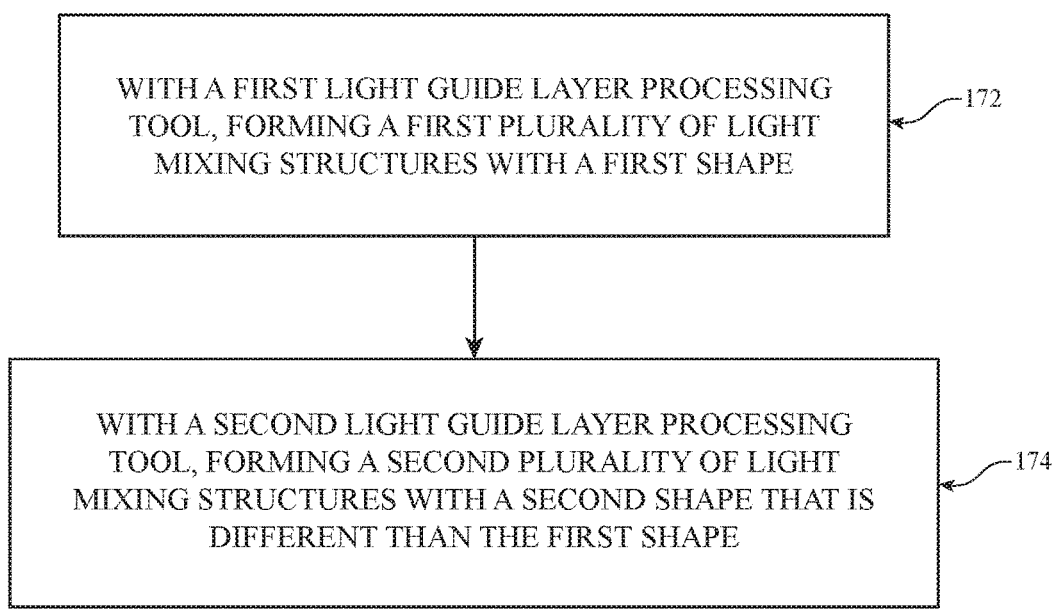
FIG. 15 is a flowchart showing illustrative steps involved with processing a light guide layer to include light mixing structures in accordance with an embodiment.

FIG. 15 shows an illustrative method for forming light mixing structures on a light guide layer. The method of FIG. 15 may be used to form light mixing structures such as the protrusions shown in FIGS. 12 and 13. At step 172, a first light guide layer processing tool may be used to form a first plurality of light mixing structures with a first shape. The light guide layer processing tool may be, for example, light guide layer processing tool 160 in FIG. 14. At step 174, a second light guide layer processing tool may be used to form a second plurality of light mixing structures with a second shape that is different than the first shape. The second light guide processing tool may be, for example, light guide layer processing tool 160 in FIG. 14.

In certain embodiments, the same light guide layer processing tool may be used in both steps 172 and 174. In other embodiments, different light guide layer processing tools may be used for each step. In one embodiment, a light guide layer processing tool with a first bit 164 may be used in step 172. After completing step 172, a different bit 164 may be attached to positioner 162. The tool may then be used in step 174 with the new bit. The bit for step 172 may be a certain size that is configured to cut light mixing structures with the first shape, while the bit for step 174 may be a different size that is configured to cut light mixing structures with the second shape.

In various embodiments of the invention, a display backlight may include a row of light-emitting diodes and a light guide layer. The light guide layer may have first and second opposing surfaces connected by an edge that may receive light from the row of light-emitting diodes. The edge may have a first plurality of protrusions that each have a first shape and a second plurality of protrusions that each have a second shape that is different than the first shape. The first plurality of protrusions and second plurality of protrusions may be arranged in a pattern. The first plurality of protrusions and the second plurality of protrusions may be arranged in an alternating pattern. In the alternating pattern, each protrusion of the first plurality of protrusions may be positioned adjacent to a respective protrusion of the second plurality of protrusions. The first shape may be a first triangular shape, and the second shape may be a second triangular shape.

The edge may have a planar portion. The first triangular shape may include first and second surfaces that are at a first angle relative to the planar portion of the edge, and the second triangular shape may include third and fourth surfaces that are at a second angle relative to the planar portion of the edge. The first angle may be between 17.5° and 22.5°, and the second angle may be between 25° and 40°. The first angle may be 20°. The second angle may be 30° or 35°. The first angle may be between 10° and 15°, and the second angle may be between 20° and 30°. The first angle may be 12.5°, and the second angle may be 25°. The display backlight may also include a reflector that is parallel to the first and second opposing surfaces of the light guide layer.

In various embodiments of the invention, a light guide layer may include a top surface, a bottom surface, and first and second opposing surfaces that connect the top and bottom surfaces. The first surface may have a pattern of light mixing structures configured to distribute light, and the pattern may include a first plurality of light mixing structures with a first shape that alternates with a second plurality of light mixing structures with a second shape that is different than the first shape. Each light mixing structure of the first plurality of light mixing structures may be interposed between respective first and second light mixing structures of the second plurality of light mixing structures. Each light mixing structure of the first plurality of light mixing structures may include a triangular protrusion with first and second surfaces of a first length. Each light mixing structure of the second plurality of light mixing structures may include a triangular protrusion with third and fourth surfaces of a second length that is different than the first length. The top surface of the light guide layer may have ridges, and the bottom surface of the light guide layer may have bumps.

In various embodiments of the invention, a liquid crystal display may include first and second transparent substrates, a liquid crystal layer between the first and second substrates, a light guide layer configured to pass backlight through the first and second substrates and the liquid crystal layer, and at least first and second light-emitting diodes that each emit light into the first edge of the light guide layer. The light guide layer may have first and second opposing edges. The first edge of the light guide layer may include a pattern of protrusions configured to distribute light, and the pattern may include a first plurality of protrusions with a first shape that alternates with a second plurality of protrusions with a second shape that is different than the first shape.

The foregoing is merely illustrative and various modifications can be made by those skilled in the art without departing from the scope and spirit of the described embodiments. The foregoing embodiments may be implemented individually or in any combination.

What is claimed is:

1. A display backlight comprising:
a row of light-emitting diodes; and
a light guide layer having first and second opposing surfaces connected by an edge, wherein the edge receives light from the row of light-emitting diodes, wherein the edge has a first plurality of protrusions that each have a first shape and a second plurality of protrusions that each have a second shape that is different than the first shape, wherein each of the first plurality of protrusions is interposed directly between respective first and second protrusions of the second plurality of protrusions, and wherein each of the second plurality of protrusions is interposed directly between respective first and second protrusions of the first plurality of protrusions.

2. The display backlight defined in claim 1, wherein the first shape comprises a first triangular shape, and wherein the second shape comprises a second triangular shape.

3. The display backlight defined in claim 2, wherein the edge has a planar portion, wherein the first triangular shape comprises first and second surfaces that are at a first angle relative to the planar portion of the edge, and wherein the second triangular shape comprises third and fourth surfaces that are at a second angle relative to the planar portion of the edge.

4. The display backlight defined in claim 3, wherein the first angle is between 17.5° and 22.5°, and wherein the second angle is between 25° and 40°.

5. The display backlight defined in claim 4, wherein the first angle is 20°.

6. The display backlight defined in claim 5, wherein the second angle is 30°.

7. The display backlight defined in claim 5, wherein the second angle is 35°.

8. The display backlight defined in claim 3, wherein the first angle is between 10° and 15°, and wherein the second angle is between 20° and 30°.

9. The display backlight defined in claim 8, wherein the first angle is 12.5°.

10. The display backlight defined in claim 9, wherein the second angle is 25°.

11. The display backlight defined in claim 1, further comprising:
a reflector that is parallel to the first and second opposing surfaces of the light guide layer.

12. A light guide layer comprising:
a top surface;
a bottom surface; and
first and second opposing surfaces that connect the top and bottom surfaces, wherein the first surface has a pattern of light mixing structures configured to distribute light, wherein the pattern comprises a first plurality of light mixing structures with a first shape that alternates with a second plurality of light mixing structures with a second shape that is different than the first shape, wherein each light mixing structure of the first plurality of light mixing structures is interposed between respective first and second light mixing structures of the second plurality of light mixing structures without any intervening light mixing structures, wherein each light mixing structure of the second plurality of light mixing structures is interposed between respective first and second light mixing structures of the first plurality of light mixing structures without any intervening light mixing structures, wherein each light mixing structure of the first plurality of light mixing structures is a protrusion, and wherein each light mixing structure of the second plurality of light mixing structures is a protrusion.

13. The light guide layer defined in claim 12, wherein each light mixing structure of the first plurality of light mixing structures comprises a triangular protrusion with first and second surfaces of a first length.

14. The light guide layer defined in claim 13, wherein each light mixing structure of the second plurality of light mixing structures comprises a triangular protrusion with third and fourth surfaces of a second length that is different than the first length.

15. The light guide layer defined in claim 12, wherein the top surface of the light guide layer has ridges, and wherein the bottom surface of the light guide layer has bumps.

16. A liquid crystal display comprising:
first and second transparent substrates;
a liquid crystal layer between the first and second substrates;
a light guide layer configured to pass backlight through the first and second substrates and the liquid crystal layer, wherein the light guide layer has first and second opposing edges; and
at least first and second light-emitting diodes that each emit light into the first edge of the light guide layer, wherein the first edge of the light guide layer comprises a pattern of protrusions configured to distribute light, wherein the pattern comprises a first plurality of protrusions with a first shape that alternates with a second plurality of protrusions with a second shape that is different than the first shape, wherein the first and second pluralities of protrusions are the only protrusions on the first edge of the light guide layer, wherein each of the first plurality of protrusions is interposed directly between respective first and second protrusions of the second plurality of protrusions, and wherein each of the second plurality of protrusions is interposed directly between respective first and second protrusions of the first plurality of protrusions.

* * * * *